March 9, 1954 — G. C. F. ASKER — 2,671,525
GAS DRIER
Filed Aug. 21, 1950
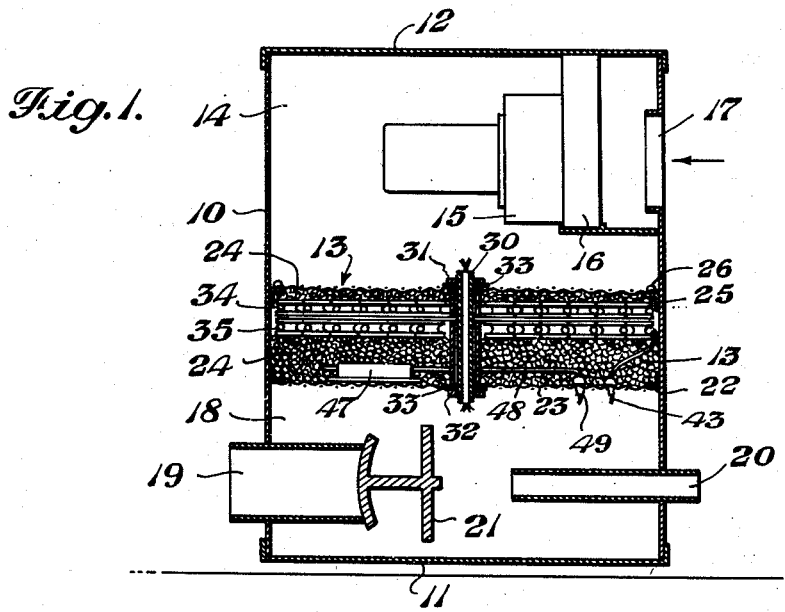
Fig. 1.
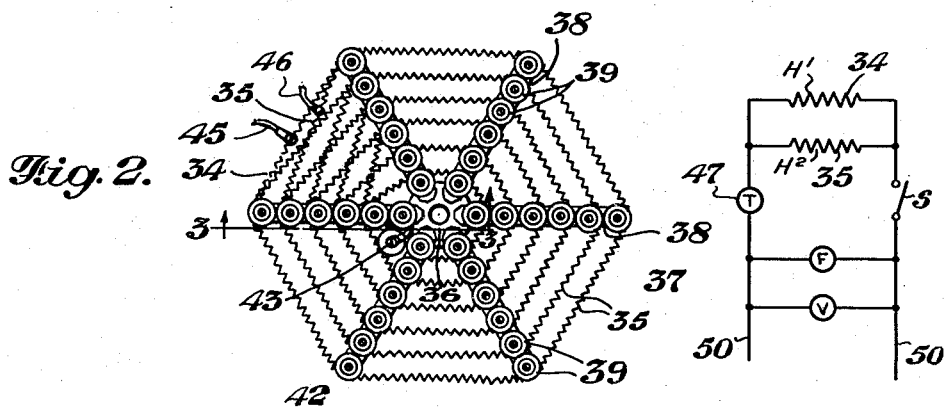
Fig. 2.
Fig. 4.
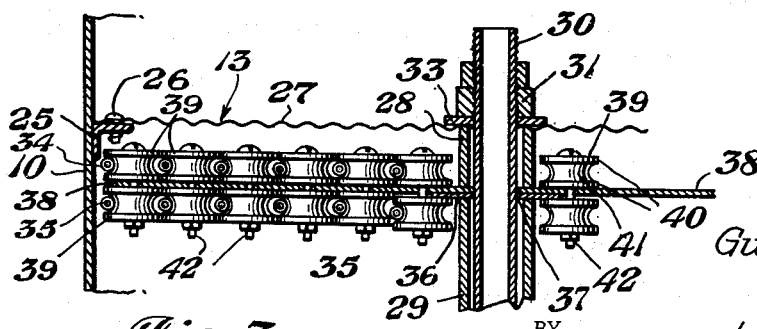
Fig. 3.
INVENTOR
Gunnar C. F. Asker
BY
Axel B. Wing
ATTORNEY

UNITED STATES PATENT OFFICE 2,671,525

GAS DRIER

Gunnar C. F. Asker, Washington, D. C.

Application August 21, 1950, Serial No. 180,601

3 Claims. (Cl. 183—4.1)

This invention relates to an improved gas drier bed and heater construction therefor, useful for regenerating the bed of an adsorbent type gas drying system.

In prior art practices the use of non-insulated wires as electrical heating elements in a gas drier bed have generally so tended to sag, and by successive heating and cooling cycles, expanded and contracted causing ultimate breaking of the heating element, so that in conventional construction today, the electrical heating elements are generally encased in ceramic insulating sleeves when mounted within the moisture adsorbent bed. Such construction, while supplying sufficient rigidity to fix the heating element within the body of the moisture adsorbent bed, so retards the heat conductivity as not only to render the regenerating cycle slow, but to greatly increase the power consumption of the unit by heat losses. Insulated wire construction has had such slow heat transfer both in heating and cooling, involving such loss of efficiency of the gas drier that this construction has generally been combined with other elaborate and expensive insulation provided between the bed and the walls of the air drier casing and has been substantially useless for units having comparatively short regeneration cycles.

According to the present invention, highly improved heater construction of non-insulated electrical resistance wire is provided and supported in a manner to rapidly regenerate the moisture adsorption material in contact therewith. The novel means hereof of supporting of such heating element further allows omission of the insulation between the bed and the gas drier walls. The novel construction of support elements also allows use of several independent heating elements to be supported in layers and each wired in parallel, whereby if any of them burn out, the others may be operative to continue operation of the gas drier. In addition the present invention provides a thermostatic control for prevention of overheating of the bed in direct contact with such non-insulated heating elements. The invention herein further provides a novel method of mounting of heating elements within and close to the top of the bed of moisture adsorbent material, whereby an air drying and regenerating cycle of higher efficiency is possible.

It is accordingly a primary object of the present invention to provide an improved electrical heater construction primarily for use with gas drying beds.

It is a further object to provide an improved combination of such heater with thermostatic controls and improved heater wiring circuits therewith to impart substantially longer life to the heater element.

It is a further object to provide improved moisture adsorbent bed construction in a gas drier using a heater element whereby an improved air drying cycle is obtainable. Other objects will be inherent in the description which is made in conjunction with the drawing hereof of which:

Fig. 1 shows a section in elevation through a gas drier showing internal construction thereof; and Fig. 2 is a detail plan view of the heater element;

Fig. 3 is a detailed section in elevation showing details of construction of the heater element and its mounting in the bed of the drying unit; and Fig. 4 is a wiring diagram showing an electrical circuit useful with the present construction.

The drawings herein show primarily the details with which the present invention is concerned. Certain features such as the valving and blowers, as well as possible modifications as to partitioning and arrangement of parts, are shown in greater detail in my copending application, Ser. No. 16,325, filed March 22, 1948, now Patent Number 2,606,627.

As shown herein, the air drier comprises a shell or housing having walls 10 having fitted thereunder a bottom 11 and top removable cover 12 to cover a drying chamber. Preferably centrally mounted therein is a bed 13, of gas drying materials which separates the housed space into an upper chamber 14 and lower chamber 18. The chamber 14 serves as a plenum and has mounted therein a blower 15, a rough fibrous filter body 16 through which air is drawn from an inlet 17, and passed through the bed 13 to the lower outlet chamber 18. The lower chamber 18 has mounted therein a dry gas outlet duct 19 and a wet gas outlet 20. The outlet ducts 19 and 20 are aligned as shown for simplified valve control. A suitable valve 21 is mounted between outlet ducts 19 and 20 for alternately closing one and opening the other for maintaining and controlling a proper air drying and bed regenerating cycle of operations. While any suitable valve construction and mechanism known in the art may be used for controlling the cycle, a suitable oscillating valve construction as shown in said aforementioned Patent No. 2,606,627 is preferably used.

The drying bed 13 is supported at the bottom by angle iron 22 fastened in metal to metal contact completely around the walls 10 of the drying chamber in any suitable manner, preferably by welding, and has a large mesh metal screen 23, such as 5 to 20 mesh, but preferably about 10, suitably fastened around the edges thereof as by welding to the angle iron 22 to form a supporting porous diaphragm for the bed material thereon, 24. The bed is several inches deep which may be varied considerably anywhere from 2 to 30 inches, depending upon the designed capacity of the drier. The top of the bed similar to the bottom has supporting angle irons 25 similarly mounted to the walls 10 with the horizontal flange thereof bounding the top of the bed and bored to receive screw fastening elements 26 which removably secure thereto a similar large mesh metal screen 27. The adsorbent material 24 comprising the bed 13, confined within the screens 23 and 27, is of graded particulate size, larger than the mesh of these screens to be retained therein in a substantially dust free manner. The gas drying material itself is any well known adsorbent in the art for moisture adsorbency such as fragments of silica gel, activated aluminum oxide, adsorbent clays and various commercial blends thereof or of other materials having a substantial capacity to adsorb moisture from gas.

Centrally mounted between the upper and lower screens 27 and 23 are a pair of upper 28 and lower 29 spacer sleeves adapted to support at their junction the heating elements hereinafter described. Fitted within the sleeve is a tubular duct 30 threaded at both ends to receive securing nuts 31 and 32 which support the tube 30 by bearing against washers 33, fastening the same against the screens 27 and 23 and compressing spacer elements 28 and 29 therebetween for securing support of the heating elements. The tube 30 is of small bore adapted to be entirely filled by insulated electric wires passing therethrough from the blower to the lower electrical wiring for current supply to the blower motor, so that the tube 30 containing these wires is substantially gas impervious.

The heater element comprises two parallel layers of wire radially disposed as a spiral of helically coiled electrical resistance wire, 34 and 35, each spiral coil lying in a horizontal plane, the two coils being separated and supported by ceramic ware insulators 39 mounted vertically on a metallic framework. The framework comprises a spider bracket having a central annular base plate disc 36 centrally bored at 37 to snugly fit about tube 30 and the several radial arms comprising metallic brackets 38 fastened to the periphery of plate 36 in any suitable manner as by bolting or welding thereto. Each bracketing arm 38 has mounted above and below a pair of vertically aligned ceramic spools 39 comprising in configuration a pair of flange members 40 with a concave neck therebetween 41, about which is regularly tensioned the helically coiled resistance wire for support thereby. The ceramic spools, for simplicity of mounting on the bracket arms, are mounted preferably in pairs, an upper and a lower one aligned therewith, both being secured to the bracketing arms 38 by any suitable fastening device such as a bolt and nut 42. With this construction two complete sets of upper and lower ceramic ware spool type insulators are mounted on the spider-like framework about which standard helically coiled electrical resistance wire is supported in tension in a horizontal spiral passing from the center outwardly from one insulating spool to the next. Current lead-wires 45 and 46 are attached to the resistance wire such that the two coils 34 and 35, upper and lower, may be independently operated in parallel. Each of these coils of wire have sufficient resistance to maintain a desired temperature, as controlled through a thermostat 47, at approximately 300 to 400° F. By this construction of vertical disposition in separate layers, the heating elements are capable of supplying this temperature in more even distribution to the drying bed particles.

For purposes of parallel supply of current for activating the resistance wires, an electrical lead is taken from the center of the coiled wire at 43 to supply current to both upper and lower spiral layers and independent lead wires are taken from the upper coiled wire assembly at the outer periphery at 45 and another from the outer periphery of the lower coiled wire assembly at 46.

In wiring the same, a current lead is taken through the thermostat 47 which controls current supply to both coils, said thermostat being preferably entirely situated within the body of the moisture adsorbent bed or has an element responsive to the bed temperature to regulate the temperature thereof and control the current supply to the heating elements in accordance with the setting thereof. The lead wires 43 and a combination of lead wires 46 to upper and lower coils by way of thermostat 47, are passed into the bed through insulators of conventional construction 49 and suitably connected according to the wiring diagram shown herein as Fig. 4.

As shown in this diagram the power inlet lines 50 supplying current, which may be typically 110 v. 60 cycle current, are wired in parallel to the element V, which is a valve timer and motor therefor, shown in detail in my Patent No. 2,606,627; in parallel with F, which is a fan motor; and in parallel with the two heating coils 34 and 35 shown as $H_1$ and $H_2$ so that the circuit will still be operative even if one of the electrical resistance wires burns out and finally in series with the heater alone and having a thermostat T corresponding with the thermostatic control 47 and in series with a switch S for activating said heater elements.

The heating coils, thus described, comprise tightly helically coiled resistance wire, such as Nichrome wire which is supported in substantial tension around ceramic insulator spools 39 mounted on the several radially extending arms 38, and tend thereby to resist sagging while being vertically disposed in layers for better heat distribution. The electrical resistance wires 34 and 35 have no insulating winding or covering.

The heating elements are mounted in the upper portion of the granular adsorbent material of the bed, only a slight distance beneath the top surface thereof, the granular material of the bed being evenly packed about the otherwise uninsulated resistance wire, whereby highly efficient heat transfer to the bed is effected. Gas to be dried is passed continuously through the bed serving to distribute the heat throughout when the bed is being regenerated.

According to the present invention, substantial improvement is possible in the efficiency of the heating or bed regenerating cycle by the characteristic construction herein disclosed. Only the upper portion of the bed is rapidly heated by the resistance wires embedded therein, but only to a controlled degree as set by the thermostat of approximately 300 to 400° F. When the heater is activated, the gas for regenerating the bed being continuously passed downwardly therethrough, distributes the heat rapidly and the entire bed is evenly heated.

In preferred operation of the gas drier with this construction it is possible to regulate the valve operation and heating element activation by a timing motor such as described in my Patent No. 2,606,627 so that the heating coils are energized for a few minutes just prior to closing of the dry air duct 19 by the valve 21 so that air drying continues while the bed is being heated up almost to a point where no more moisture is being adsorbed. Then in the regeneration part of the cycle, with the valve 21 closing duct 19, duct 20 being then open, the heating coils are de-energized several minutes, as much as 5 or 6 minutes, prior to opening the dry air outlet 19 and closing duct 20, which allows substantial cooling of the bed prior to opening of said dry air outlet for the air drying cycle. Gas is thus produced in a relatively dry state at all times, inasmuch as the adsorbent material is efficiently active only when cool, the cooling of the bed taking place during the regeneration cycle, and the heating of the bed commencing a short period in advance of the termination of the air drying cycle. With this type of cycle it becomes unnecessary to spend substantially excessive amounts of power necessary to drive off last traces of moisture, so that relatively short regeneration periods with very small expenditure of power therefor are possible.

These several advantages become possible by the type of uninsulated electrical heater and its disposition near the top of the bed with non-insulated coils in direct contact with a substantial portion of the moisture adsorbing material, taking advantage of very high heat transfer in a short period of time. Thus, as described the unit is flexible to give a substantially rapid and evenly distributed heat output by the heating element without use of excessive temperatures over long periods of time. With this construction no insulation is necessary between the bed and the walls of the drier; nor is it necessary to apply special controls for air passages, a common feature of known construction, where heating elements are disposed outside of the bed.

The construction hereof allows even distribution of heat quickly available by having the heater elements of a non-sagging character and vertically disposed in radial layers. The heater coils are operative in parallel, whose heat output is controlled by the thermostat 47 and embedded in particles of porous inorganic material which tends to radiate the heat which is evenly distributed by the gas passing through the bulk thereof.

Operating as a gas drier, in the drying cycle of operation, with the heating element inactivated, air or other gas to be dried is drawn into the plenum chamber 14 by blower 15 from any source of supply through the opening thereof 17 and filter 16. The gas is passed downwardly through the bed and out of gas duct 19 into the dry gas disposal area. Valve 21 at this portion of the cycle is seated upon wet air outlet duct 20. After sufficient moisture has been adsorbed by the bed as set by any convenient motor and timing cycles shown in detail in my copending application above referred to, the switch S is cut in to activate the upper and lower heating coils 34 and 35 about minute or two prior to reversal of the valve 21. Valve 21 is then reversed, at which time the bed has substantially warmed up. In this position dry air duct 19 is closed and wet air duct 20 is open, as shown in the valve position of Fig. 1. Passage of gas through the bed after the bed has reached a substantial temperature in the range of 300 to 400° F. will saturate the gas with moisture picked up from the bed at this temperature, the gas being finally passed out through wet air duct 20 and disposed of outside of the system through suitable piping (not shown). Several minutes, about 5, prior to the end of the regenerating cycle, and somewhat prior to complete removal of moisture from the bed, the main switch S is cut off without reversing the valve 21, the gas continuing to pass through the west air duct 20, thus allowing the bed to become substantially cooled. At the termination of this period the valve 21 is then reversed to close the wet air duct 20 opening simultaneously the dry gas duct 19 and the gas drying cycle begins and continues. During the bed regenerating cycle the thermostat automatically controls the passage of current through the electrical resistance heater coils to prevent the temperature of the bed from exceeding about 300° to 400° F. above which the moisture adsorbent material might be damaged by excessive heating.

Certain modifications may occur to those skilled in the art. For example, it is possible to mount the bed within the casing without the fastenings shown for rapid removal in replacement thereof. Other means may be provided for securely supporting the heating element at a fixed position within the air drying bed. Various types of partitioning elements may be used as well as arrangements of blower, drying bed and valving. Thus single and duplex units of the character shown in my Patent No. 2,606,627 may be used with the type of heater construction herein shown.

It is accordingly intended that the description given herein be regarded as exemplary and not limiting except as defined in the claims appended hereto.

I claim:

1. A gas drier comprising a housing enclosing a chamber having a bed of moisture adsorbent material mounted therein, an electrical heating element fixed within the body of said bed of moisture adsorbent material, said electrical heating element comprising a supporting spider bracket having metallic arms radially supported from a central base plate, a plurality of ceramic insulating spools disposed in rows both above and below each of said supporting arms, and helically coiled uninsulated electrical resistance wires non-saggingly supported in vertically disposed layers both above and below said spider bracket, said wire being wound in separate parallel spiral layers from the center outwardly around said insulating spools said spirally wound layers of electrical resistance wire being fixedly supported by said spider bracket within said bed near the top thereof, there being no insulation about said resistance wires.

2. A gas drier comprising a metallic housing enclosing a chamber, a pair of large mesh metallic screens mounted horizontally parallel in said chamber directly fastened at the edges of said screens in direct metal contact to the metallic walls of said housing, said screens being vertically disposed to confine and support a bed of moisture adsorbent gas drying material therebetween of substantial depth, a pair of spacer sleeves centrally mounted between the upper and lower screens to support a spider bracket therebetween at a position within and near the top of said bed of drying material, several supporting arms radially extending from the juncture of said spacer sleeves, said arms radiating symmetrically through a substantial horizontal area of said bed, a plurality of ceramic insulating spools disposed in upper and lower horizontal rows on both sides of each of said supporting arms, helically coiled uninsulated electrical resistance wire non-saggingly supported by being wound in a spiral from the centermost insulating spools outwardly around said insulating spools to form vertically disposed upper and lower parallel layers of electrical resistance wire in direct contact with fragments of the moisture adsorbent materials comprising said drying bed, a thermostat responsive to the temperature of said bed of drying materials during the heating thereof to regenerate the same, said electrical resistance wires of each layer being connected in parallel to a source of electrical current supply and both of said layers being connected in series with said thermostat, each of said electrical resistance wire layers having sufficient resistance to maintain the temperature of said bed during the regeneration thereof.

3. A gas drier comprising a metallic housing enclosing a chamber, two large mesh metal screens disposed horizontally parallel between the top and bottom of said chamber each fastened at the edges thereof in direct metal to metal contact with the walls of said housing to confine therebetween a bed of substantial depth composed of fragments of highly porous moisture adsorbent inorganic material screened to a particle size larger than the mesh openings of said supporting screens, several ceramic insulating spools fixedly supported vertically with horizontal upper and lower faces in parallel planes near but beneath the upper surface of said drying bed, at least one continuous coil of helically wound uninsulated electrical resistance wire tensioned around the middle waist portion of each spool in sag resistant manner from spool to spool, a blower mounted above said bed adapted to continuously draw gas to be dried to the top of said chamber and pass the same downwardly through the bed, a pair of outlet ducts alignedly mounted beneath said bed one of said outlets leading to a dry gas disposal area and the other to a wet gas disposal area, a valve mounted for oscillation between said outlets adapted to close one thereof while opening the other, an electrical thermostat in circuit with said electrical resistance wire adapted to control the flow of current thereto in thermostatic response to the temperature developed by said resistance wire, an electrical switch in circuit with both said thermostat and electrical resistance wire, and means for timing the actuation of said valve and said electrical switch means each in timed relation to the other whereby substantial heat may be imparted to said electrical heating means during a gas drying cycle for a short period preceding the bed regenerating cycle and for cooling said bed by breaking the circuit through said heating electrical resistance coil during said regenerating cycle for a short period preceding the said gas drying cycle.

GUNNAR C. F. ASKER.

References Cited in the file of this patent

UNITED STATES PATENTS

| Number | Name | Date |
| --- | --- | --- |
| 1,986,814 | Hartman | Jan. 8, 1935 |
| 2,471,376 | Peters | May 24, 1949 |
| 2,501,280 | Kemp et al. | Mar. 21, 1950 |
| 2,506,578 | Case | May 9, 1950 |
| 2,508,357 | Ames | May 23, 1950 |
| 2,511,666 | Barr | June 13, 1950 |

FOREIGN PATENTS

| Number | Country | Date |
| --- | --- | --- |
| 80,607 | Switzerland | Mar. 11, 1919 |
| 309,376 | Great Britain | Apr. 11, 1929 |